UNITED STATES PATENT OFFICE.

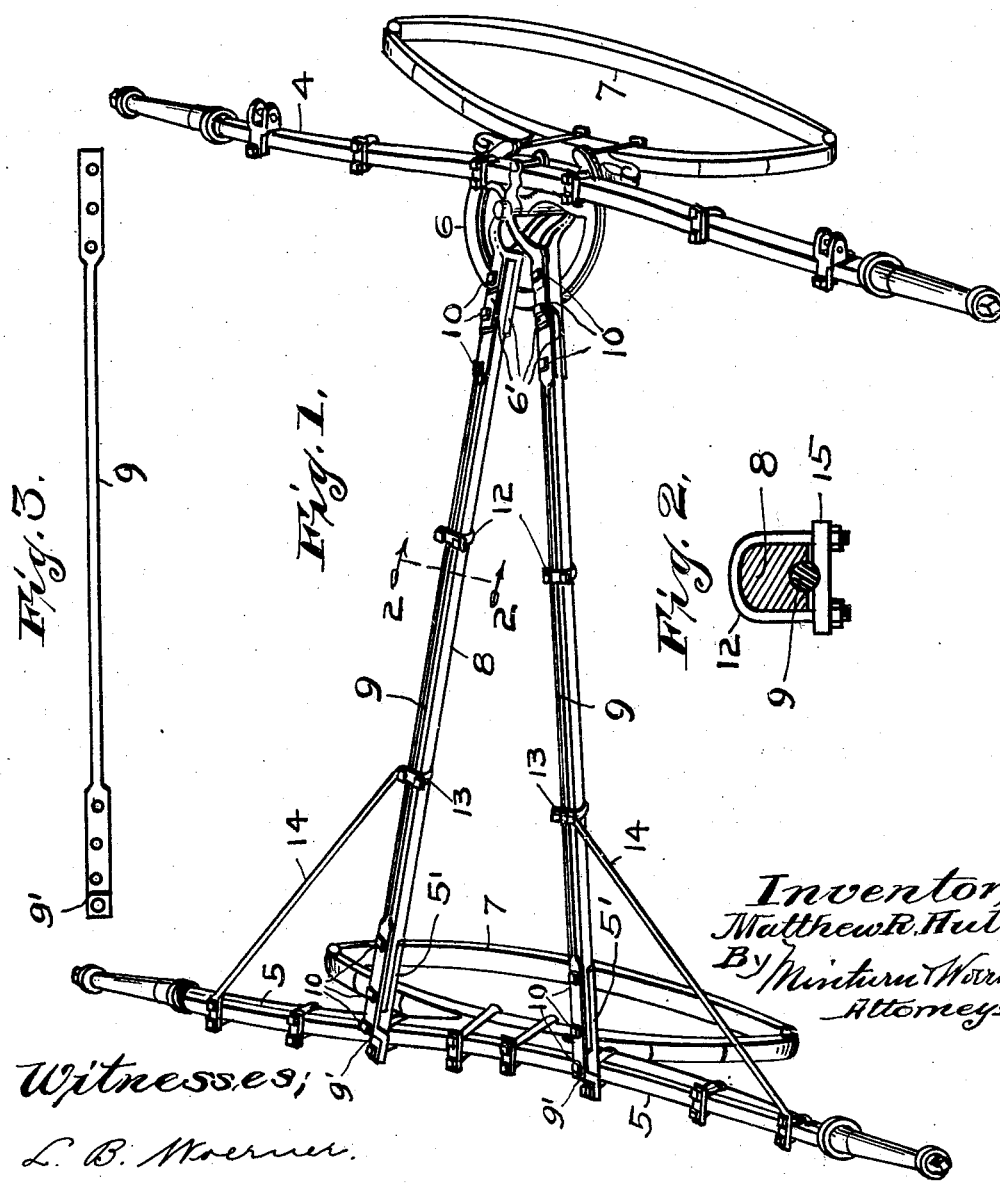

MATTHEW R. HULL, OF CONNERSVILLE, INDIANA, ASSIGNOR TO REX BUGGY COMPANY, OF CONNERSVILLE, INDIANA, A CORPORATION OF INDIANA.

VEHICLE-REACH.

937,940.

Specification of Letters Patent. Patented Oct. 26, 1909.

Application filed September 28, 1908. Serial No. 455,045.

*To all whom it may concern:*

Be it known that I, MATTHEW R. HULL, a citizen of the United States, residing at Connersville, in the county of Fayette and State of Indiana, have invented certain new and useful Improvements in Vehicle-Reaches, of which the following is a specification.

This invention relates to improvements in the construction of reaches for vehicles, and the object of the invention is to supply the necessary strength and resiliency to the inferior grade of wood which it is necessary at this day to use because of the scarcity of other timber.
The object also is to supplement the wood in a manner that will relieve the fifth-wheel from constant vibration and concussion which tends to crystallize the metal and cause it to break.
I accomplish the objects of the invention by the mechanism illustrated in the accompanying drawing, in which—

Figure 1 is a view in perspective of the front and rear axles of a vehicle connected with my improved reach, the view showing the parts in reverse or upside-down position, in order to expose more clearly the reinforcing rods. Fig. 2 is a cross section of one member of the reach on the line 2—2 of Fig. 1, and Fig. 3 is a detail in plan of one of the metal reinforcing rods.

Like characters of reference indicate like parts throughout the several views of the drawing.
4 is a front axle and 5 a rear axle of a vehicle of usual construction, 6 the fifth-wheel having rearward strap extensions 6′ in pairs for the attachment of a reach, and 7 a pair of elliptic springs.
8 are the two members of the reach, which are connected at their forward ends with the fifth-wheel 6 and at their opposite or rear ends to a rear reach strap 5¹ on the rear axle 5.
9 represents my reinforcing rod, the major middle length of which is preferably round, oval or angular iron, in cross section, and the ends of which are flattened and provided with bolt holes for the passage of bolts 10 by which the rods 9 are secured at their ends to the wooden members of the reach the rear ends are bent to form a shoulder 9′ to bear against the end of the wooden members. These wooden members of the reach are grooved longitudinally to receive the body portions 9 of the reach-rods, and the rods, 9 are additionally secured to the wood members by clips 12 and 13. The clips 13 serve also for securing the diagonal brace-rods 14 to the respective members of the reach. As shown in Fig. 2 the clip bars 15 are notched to receive the rods 9 in order to better hold the position of said rods and to prevent displacement of the clips.

The rods 9 are preferably constructed from spring steel and they supply the strength that is present in first class hickory reaches but which is absent in the inferior wood which vehicle builders are compelled to use, on account of the scarcity of timber.

I am aware that wooden reaches have been supplemented with both strap and channel steel, but in both of such uses the fifth wheel with which the reinforcing metal was connected was rendered useless and dangerous by crystallization of its molecular structure by the constant vibration and pounding transmitted to it. This objection is overcome by my construction.

Having thus fully described my invention what I claim as new and wish to secure by Letters Patent of the United States, is—

In a vehicle, a fifth wheel having extensions in pairs for the attachment thereto of a reach, a rear axle, a rear reach strap, a reach comprising a wooden top member having a longitudinal under side groove and a steel reinforcing rod in said groove said rod having its ends flattened and perforated, the rear flattened portion being bent across the end of the wooden reach member, the front end of said reinforced reach being inserted between said pair of extensions from said fifth wheel, the rear end of the wooden member of the reach being in contact with said rear reach strap, a clip securing the reinforcing rod to the wooden member of the reach, other clips uniting the wood and metal reach members, and bolts securing both wood and metal members of the reach to both members of the pair of said fifth wheel extensions at one end of the reach and to the rear reach strap at the other end of the reach.

In witness whereof, I have hereunto set my hand and seal at Connersville, Indiana, this 16th day of Sept., A. D. one thousand nine hundred and eight.

MATTHEW R. HULL. [L. S.]

Witnesses:
  C. C. HULL,
  E. W. RYAN.